United States Patent
Golovkin et al.

(10) Patent No.: US 10,073,112 B2
(45) Date of Patent: Sep. 11, 2018

(54) AIR PRESSURE PROBE

(71) Applicants: FEDERAL STATE UNITARY ESTABLISHMENT CENTRAL AEROHYDRODYNAMIC INSTITUTE NAMED AFTER PROF. N. E. ZHUKOVSKY (FGUP TSAGI), Zhukovsky (RU); JOINT STOCK COMPANY "AEROPRIBOR-VOSKHOD", Moscow (RU)

(72) Inventors: Mikhail A. Golovkin, Zhukovsky (RU); Andrey V. Vyalkov, Zhukovsky (RU); Andrey A. Efremov, Zhukovsky (RU); Vadim V. Sysoev, Zhukovsky (RU); Oleg A. Gulyaev, Zhukovsky (RU); Vyacheslav N. Dyatlov, Moscow (RU); Oleg I. Nazarov, Moscow (RU); Aleksey A. Koshelev, Moscow (RU); Vladimir G. Kravtsov, Moscow (RU)

(73) Assignees: Central Aerohydrodynamic Institute named after prof. N.E. Zhukovsky, Zhukovsky (RU); Joint stock company AEROPRIBOR VOSKHOD, Moscow (RU)

( * ) Notice: Subject to any disclaimer, the term of this patent is extended or adjusted under 35 U.S.C. 154(b) by 87 days.

(21) Appl. No.: 14/915,614

(22) PCT Filed: Aug. 28, 2014

(86) PCT No.: PCT/RU2014/000644
§ 371 (c)(1),
(2) Date: Feb. 29, 2016

(87) PCT Pub. No.: WO2015/030632
PCT Pub. Date: Mar. 5, 2015

(65) Prior Publication Data
US 2016/0258974 A1    Sep. 8, 2016

(30) Foreign Application Priority Data

Aug. 29, 2013  (RU) ................................ 2013140011

(51) Int. Cl.
*G01P 5/165*      (2006.01)
*G01M 9/06*       (2006.01)

(52) U.S. Cl.
CPC ............... *G01P 5/165* (2013.01); *G01M 9/06* (2013.01)

(58) Field of Classification Search
CPC .................................. G01P 5/165; G01M 9/06
See application file for complete search history.

(56) References Cited

U.S. PATENT DOCUMENTS 3,244,001 A * 4/1966 Pettingall ................ G01P 5/165
73/180
3,400,583 A * 9/1968 Newport ................ G01P 5/165
73/182

(Continued)

*Primary Examiner* — David Bolduc
(74) *Attorney, Agent, or Firm* — Patentagar PLLC; Alexander Rabinovich

(57) ABSTRACT

An air pressure probe (APP) relates to the field of aviation and is intended to determine aircraft flight parameters or wind tunnel flow parameters. The APP comprises a head part with intake holes located thereon, which are connected by channels to couplers, and a support, attached to the head part from behind. The surface of the head part is provided with flow vortex generators. The generators can be in the form of indentations or protrusions of various shapes on the surface of the air pressure probe, or in the form of ribs formed as a result of the mating of elements of the flat or curved planes that form the surfaces of the head part and the support. The technical result is an increased operational range of measurement and a wider field of practical application.

16 Claims, 5 Drawing Sheets

(56) References Cited

U.S. PATENT DOCUMENTS

| | | | | |
|---|---|---|---|---|
| 3,750,470 A * | 8/1973 | Partzsch | G01P 13/025 | 73/182 |
| 4,297,900 A * | 11/1981 | Brandt, Jr. | G01F 1/46 | 73/861.66 |
| 4,378,697 A * | 4/1983 | DeLeo | G01P 5/165 | 73/182 |
| 4,537,647 A * | 8/1985 | Foster | B05D 1/32 | 156/245 |
| 4,833,917 A * | 5/1989 | Wilson | G01P 5/165 | 73/170.02 |
| 4,920,808 A * | 5/1990 | Sommer | G01P 5/165 | 73/170.14 |
| 5,222,896 A * | 6/1993 | Smith, Jr. | G09B 27/08 | 434/135 |
| 5,233,865 A * | 8/1993 | Rossow | G01F 1/46 | 73/147 |
| 5,313,700 A * | 5/1994 | Dorman | F01D 5/145 | 29/889.7 |
| 5,423,209 A * | 6/1995 | Nakaya | G01F 1/46 | 73/182 |
| 5,929,331 A * | 7/1999 | Kinser | G01M 9/065 | 73/147 |
| 6,176,130 B1 * | 1/2001 | Nakaya | G01P 5/165 | 73/182 |
| 6,547,678 B2 * | 4/2003 | Barfield | A63B 37/0004 | 473/383 |
| 6,557,423 B1 * | 5/2003 | Vozhdaev | G01P 13/025 | 73/861.65 |
| 6,915,687 B2 * | 7/2005 | Foster | B64D 43/02 | 73/170.02 |
| 7,128,666 B2 * | 10/2006 | Veilleux | A63B 37/0004 | 473/384 |
| 7,334,467 B1 * | 2/2008 | DuPuis | G01P 5/165 | 73/170.02 |
| 7,389,612 B1 * | 6/2008 | Fischbeck | E04B 1/3211 | 52/655.2 |
| 7,392,710 B1 * | 7/2008 | Ben-Mansour | G01D 11/245 | 73/727 |
| 2002/0121135 A1 * | 9/2002 | Rediniotis | G01P 13/025 | 73/170.11 |
| 2012/0298801 A1 * | 11/2012 | Ellison | B64D 43/02 | 244/129.1 |
| 2014/0251000 A1 * | 9/2014 | Doolittle | G01P 5/165 | 73/178 R |
| 2014/0251001 A1 * | 9/2014 | Doolittle | G01P 5/165 | 73/178 R |
| 2014/0331750 A1 * | 11/2014 | Vander Hoek | G01F 1/34 | 73/112.01 |

\* cited by examiner

AIR PRESSURE PROBE

CROSS-REFERENCE TO RELATED APPLICATIONS

This application is a U.S. CIP National phase application of the International application PCT/RU2014/000644 filed Aug. 28, 2014, which claims priority to Russian application 2013140011 filed on Aug. 29, 2013, the both International and Russian applications being hereby incorporated by reference in their entirety.

BACKGROUND OF THE INVENTION

Field of the Invention

The invention relates to the field of aviation, more specifically—to devices for determining air vehicle flight parameters or wind tunnel flow parameters, and even more specifically—to measuring three components of an air speed vector and a static pressure.

Description of the Related Art

The air pressure probe (APP) is the most important component of the airflow parameter measurement system. The information obtained therefrom is processed further to determine the values of flight altitude and speed to be displayed in the cockpit of a flying vehicle for its crewmembers.

Existing currently are air probes with a number of configurations:

those implemented in the form of elongated axially symmetrical bodies with a head part in the form of a hemisphere, a cone or an ogive, and with several intake holes on the head part, which are connected via pneumatic channels to couplers (A. N. Petunin, Methods and techniques for measuring gas flow parameters.—M.: Mashinostroenie, 1972, pp. 20-21, 118-125);

those with the housing in the form of a cylinder rod with a circular section and with intake holes, located on a lateral surface of the housing and connected via pneumatic channels to couplers (A. N. Petunin. Methods and technique of measuring gas flow parameters, M., Mashinostroenie, 1972, pp. 88-100);

those with the housing in the form of a cylinder rod, with a bottom cross section, and with intake holes located both on the front windward part of the housing, and on the bottom cross section (M. A. Golovkin, V. I. Guskov, A. A. Efremov, Air pressure probe, RU 1723879 of Mar. 11, 1997.

The main disadvantage all those and similar APPs have is the impossibility of measuring parameters of a three-dimensional gas flow.

The closest analog, considering the operations to be carried out and the technical solution implemented, is the APP, which has a spherical head part with intake holes located thereon and connected via pneumatic channels to couplers, and a straight or L-shaped support with a circular section (Vijay Ramakrishnan and Othon K. Rediniotis. Development of a 12-Hole Omnidirectional Flow-Velocity Measurement Probe, AIAA Journal, Vol. 45, No. 6, June 2007, pp. 1430-1433).

This APP has the following disadvantages.
the measurement range is limited by Reynolds numbers and flow speed;
the surface quality of the head part of the APP should meet tough requirements;
complicated design;
limited area of the practical applicability of the APP.

The abovementioned disadvantages result from the following.

1. It is known (K. P. Petrov, Simple Shape Body Aerodynamics. Scientific publication—M.: Factorial Publishing House, 1998, pp/58-68), that increasing the Reynolds number results in flow-around modification of a smooth sphere from subcritical to supercritical resulting in sharp shift of the position of the flow break-away point. Coming with that is a sharp (by speed and, respectively, Reynolds number) change of pressure distribution over the smooth sphere surface. This results in the need to account for the dependence of the flow-around nature on the Reynolds number, when simulating the APP mathematically, expanding the database and introducing certain corrections. This, correspondingly, complicates further calculations of the component vector of speed and angle of attack, based on the math model created. To eliminate this problem, the head part of the prior art is designed as a sphere with small diameter (d=6.35 mm and d=9.53 mm) (www.aeroprobe.com), resulting in the entire operational range of speeds (V<320 m/s for the sphere with d=6.35 mm and V<70 m/s for the sphere with d=9.53 mm, ibid.), as well as Reynolds numbers, associated with the head part flow-around, to have the subcritical nature, and the boundary layer on its surface to be laminar. However, experiment results displayed on FIG. 10 and reflected in (K. P. Petrov, ibid.), reveal that under subcritical flow-around of a smooth sphere, and with the Reynolds number Re=85000, the laminar boundary layer separation takes place when the angle $\varphi \approx 77°$ (wherein $\varphi$ is the angle between radius vectors of a stagnation point and a boundary layer separation point). As result, measuring arbitrarily directed vector of speed required 18 holes for pressure measurement to be made on the surface of the head part of the APP, distributed evenly and symmetrically, each of the holes being connected to a coupler via a pneumatic channel, thus making the APP design more complicated, and increasing the APP weight. Using less holes, distributed evenly, for this design of APP, generally, is not acceptable, for this may result in a situation (with stagnation point matching one of the intake holes), where the air pressure would be conclusively measured with only one hole, the rest being at the separation zone. Besides, the dimensions of the head part and the support part attached thereto would necessitate using pneumatic channels with a very small inner diameter. Together with the long length of a pneumatic channel (for the head part with d=9.53 mm (www.aeroprobe.com), the full length l with the L-shaped support is 357 mm), it leads to significant delays in the signal passage, and, thus, to delay in obtaining measurement results.

2. It is commonly known, that the need to guarantee subcritical flow-around of the sphere and laminar boundary layer on its surface (without forced laminarization by dedicated devices, which would be hard to use due to small dimensions of the APP) toughens requirements to the sphere surface smoothness. Any irregularities or unsmooth spots on the surface result in boundary layer turbulence which leads to turning subcritical flow-around into supercritical one (for example, see Prandtl L.—Tietjens O. Hydro- and aeromechanics—ONTI NKTP USSR, Moscow, Leningrad, 1935, pp. 41-45, 52-54), resulting in significant distortion of the total flow-around picture against the one, the math simulation model of flight parameter calculation was developed for.

3. The abovementioned APP features result in limitations on practical usability of the prior art probe, which may only be used in wind tunnels and test benches. Using it in real flying vehicles is impossible, because, due to small dimensions, it cannot host a number of systems, which are obligatory for the use on APPs mounted on real flying vehicles, in particular, heating systems, systems for condensed water vapor removal from pneumatic channels etc. Making the APP larger is impossible either, because this, due to restrictions imposed on Reynolds number to keep flow-around subcritical, would narrow the range of measurable speeds down to unacceptable level (V<30 m/s).

SUMMARY OF THE INVENTION

The object of the invention is to present an APP, which would possess operational features improved in comparison with the prior art, and have the abovementioned disadvantages eliminated.

The technical result of the invention includes:
1) supercritical flow-around of the APP head part throughout the entire subsonic range of speeds and Reynolds numbers due to placing vortex generators onto the surface of the head part;
2) improved operational range of oncoming flow speeds;
3) simplified design of the APP;
4) wider field of practical applicability for the APP.

The formulated object and the technical result are achieved by providing an APP comprising a head part with intake holes located thereon, the intake holes being connected with couplers via pneumatic channels, and a support attached to the head part from behind, wherein the head part surface is provided with vortex generators to initiate supercritical flow-around and to eliminate influence by the Re number.

The technical result is achieved also due to the fact, that vortex generators are implemented in the form of ribs created as result of fitting surface elements together at an angle $\xi \neq 0$ with curvature lying within $0-\pm(0.9/H)$ and outline dimensions within 0.01H-0.4H, where H is a minimal outline dimension of the head part.

The technical result is achieved also due to the fact, that vortex generators are implemented as indentations $a_1 \leq 0.1H$ deep and $b_1 \leq 0.1H$ wide, or protrusions $a_2 \leq 0.1H$ high and $b_2 \leq 0.1H$ wide.

The technical result is achieved also due to the fact, that the head part has a shape of a convex polyhedron, the number of flat faces thereof being within the range of 10-1000.

The technical result is achieved also due to the fact, that the head part has a shape of an icosahedron.

The technical result is achieved also due to the fact, that the head part has a shape of a dodecahedron.

The technical result is achieved also due to the fact, that the head part has a shape of a polyhedron with 192 faces, built based on a dodecahedron.

The technical result is achieved also due to the fact, that the intake holes are located on the head part faces, the number of the intake holes is 12, and the number of the faces is divisible by 12.

The technical result is achieved also due to the fact, that the support surface comprises no vortex generators or has vortex generators on a part of support surface.

The technical result is achieved also due to the fact, that the support is a multi-sided cylinder with such a cross-section, that a circle circumscribed around the cross-section has diameter d such, that d<H, and the ribs established by mating the sides are flow vortex generators.

BRIEF DESCRIPTION OF DRAWINGS

The concept of the present invention, its features and advantages will be better understood when discussed in more detail with the use of accompanying drawings, in which.

DETAILED DESCRIPTION OF THE INVENTION

Figure 1:
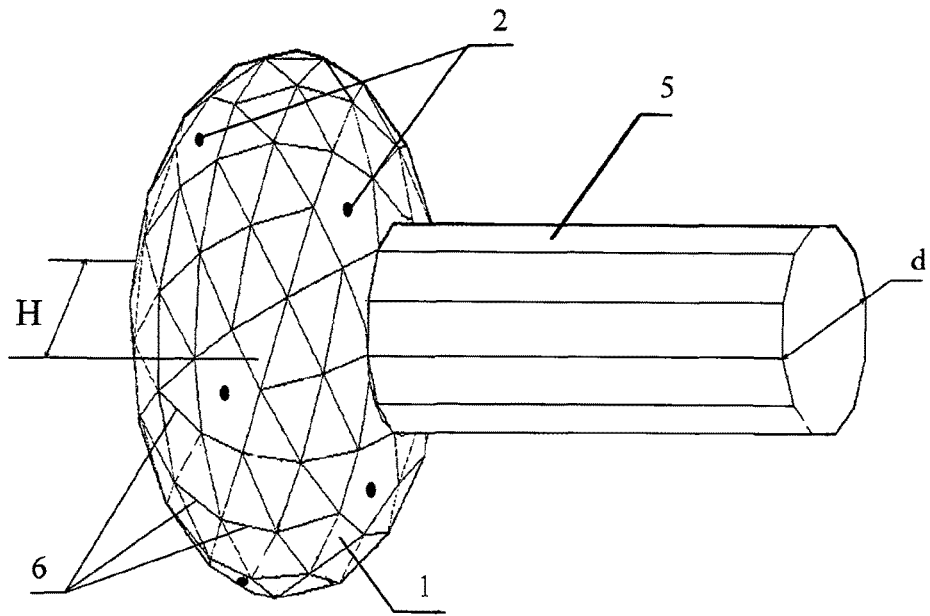
FIG. 1 shows the diagram of the exterior appearance of the APP, with the head part not inscribed in a sphere and composed of flat (or curved) surface elements mated with each other.
Figure 2:
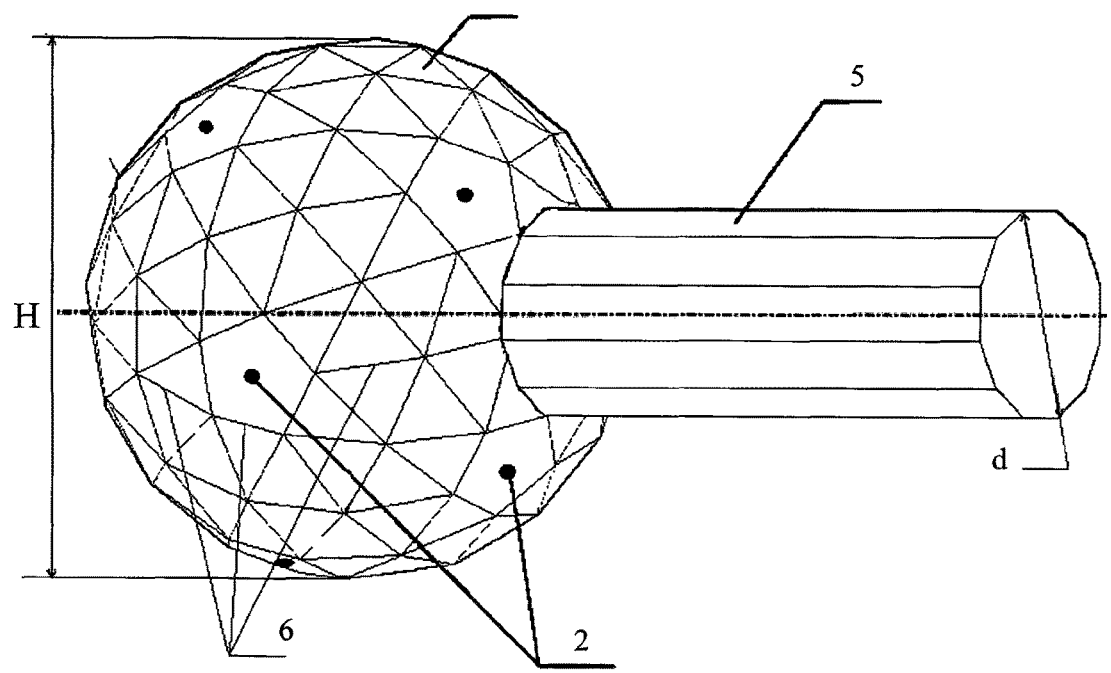
FIG. 2 shows the diagram of the exterior appearance of the APP, wherein the head part has a shape of a convex polyhedron inscribed in a sphere and having the number of flat faces equal to 192.
Figure 3:
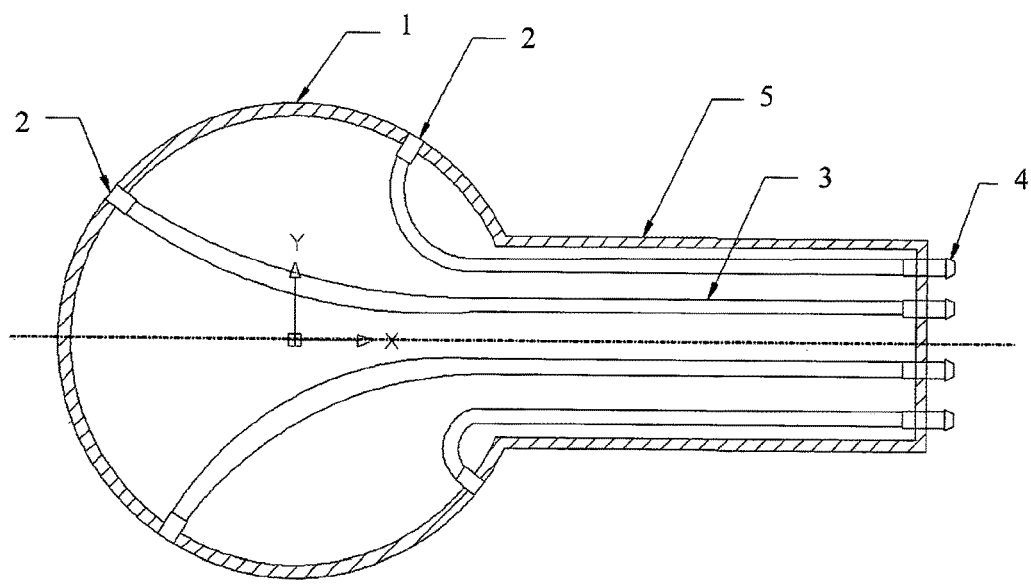
FIG. 3 shows the APP internal design diagram.

In an embodiment, the APP comprises a head part (or a front part) 1 with intake holes 2, which are connected via pneumatic channels 3 to couplers 4, and a support 5 (or a back part) (FIGS. 1, 2, 3). The probe is designed in such a manner, that it may determine static pressure of the approaching flow and the speed vector regardless of its orientation (i.e. it is an all-aspect APP), and operate within a wide range of Reynolds numbers in incompressible flow modes. In FIG. 1, an outer appearance of the APP is presented, the head part 1 of the APP being comprised of mutually mating elements of flat surfaces, rather than being inscribed into a sphere. Also possible is the use of elements of curved surfaces. In FIG. 2, an outer appearance of the APP is presented, the head part 1 of the APP being configured as a convex polyhedron inscribed into a sphere and having 192 flat faces. The intake holes 2 for measuring pressure are located along radius-vectors of the centers of the faces of a regular 12-face polyhedron (dodecahedron) used as a base for forming the APP head part. In general, the intake holes are uniformly distributed over the head part surface.

Figure 4:
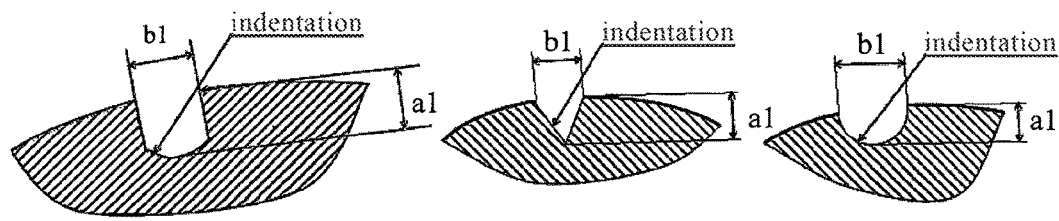
FIG. 4 shows the diagram of the flow vortex generators in the form of indentations on the APP head part.

FIG. 4 illustrates the implementation of the flow vortex generators in the form of indentations on the surface of the head part of the APP. The overall dimensions of the indentations are limited by the depth $a_1 \leq 0.1H$ and width $b_1 \leq 0.1H$. The cross-section of the indentation can be shaped with rectilinear sides (parallel or converging). The cross-section can also have a form of a second-order curve, such as arc of circle, parabolic or hyperbolic curve or ellipse.

Figure 5:
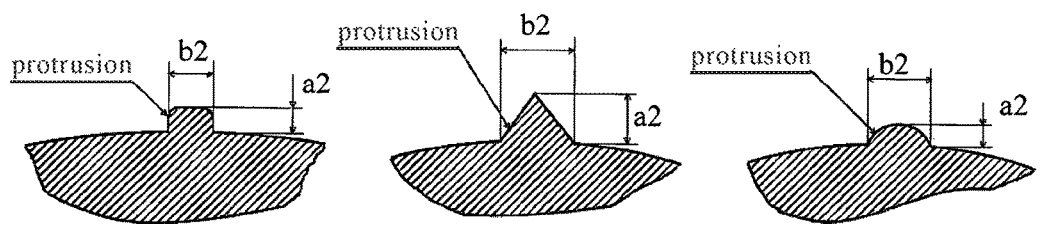
FIG. 5 shows the diagram of the flow vortex generators in the form of protrusions on the APP head part.

FIG. 5 presents the implementation of the flow vortex generators in the form of protrusions on the surface of the head part of the APP. The overall dimensions of the protrusions are limited by the depth $a_2 \leq 0.1H$ and width $b_2 \leq 0.1H$. The cross-section of the protrusion can be shaped with rectilinear sides (parallel or converging). The cross-section can also have a form of a second-order curve, such as arc of circle, parabolic or hyperbolic curve or ellipse.

Figure 6:
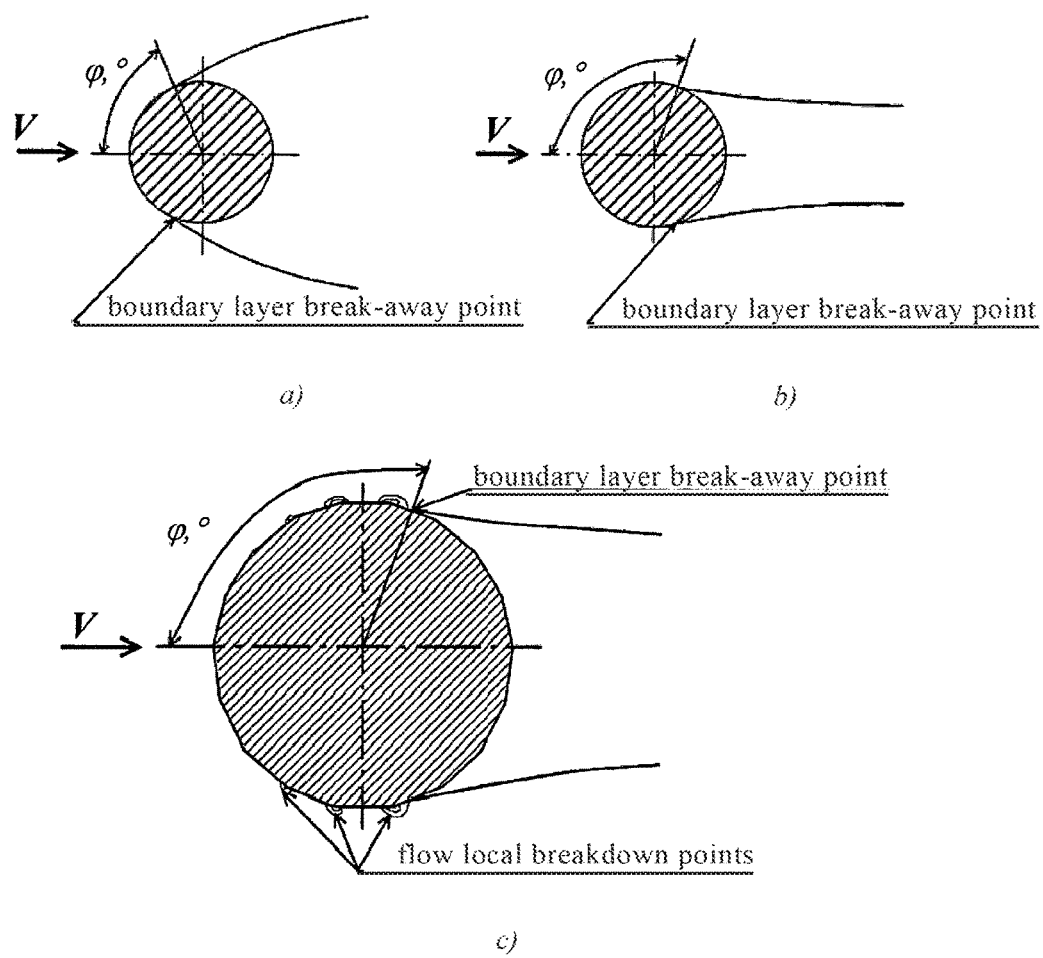
FIGS. 6a-6c show the diagram for subcritical (6a) and supercritical (6b) flow-around of the sphere, and the diagram for flow-around of a polyhedron (6c)

FIG. 6 illustrates subcritical (at small Reynolds numbers) (FIG. 6a) and supercritical (at large Reynolds numbers) (FIG. 6b) flow-around of the sphere, as well as a diagram of flow-around of a polyhedron (FIG. 6c). It follows from the diagrams that the location of a break-away point changes substantially with the character of the flow-around changing from subcritical to supercritical. At that, a dramatic change of the pressure distribution over the surface of the sphere occurs. The vortex generators located on the surface of the polyhedral APP (FIG. 6c) are in fact local breakdown (break-away) generators where intense energy dissipation occurs, whereby the initiation of a global flow break-away delays. This leads to a supercritical character of the APP head part flow-around within the entire operating range of speed and Reynolds numbers. The FIGS. 6a and 6b diagrams are published in K. P. Petrov, ibid.

Figure 7:
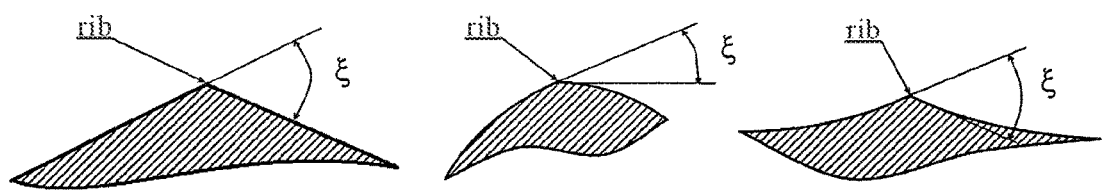
FIG. 7 shows the diagram of the flow vortex generators in the form of ribs created by mating two surfaces.

FIG. 7 presents the flow vortex generators shaped as ribs formed by matching two surfaces at an angle $\xi \neq 0$. The surfaces can be both flat (two-dimensional) and curved (convex or concave), their curvature being within the range of $0-\pm 0.9/H$, where H is a minimal outline dimension of the head part.

The APP geometry (the head part and the support), as proposed to eliminate the influence of Reynolds number, is creatively different by making its surface comprising flow vortex generators 6, rather than smooth. The vortex generators may include indentations (FIG. 4) or protrusions (FIG. 5) located upon the APP surface. The shape of indentations or protrusions may differ from the ones FIGS. 4 and 5 show. Located on the APP surface, the vortex generators are local separation generators, wherein intensive energy dissipation takes place, thus slowing down the global flow separation appearance. As a result, the airflow around the APP head part is supercritical within the entire operating range of Reynolds numbers. A diagram for subcritical and supercritical flow-around of a sphere, as well as of a polyhedron, is represented in FIG. 6.

As one of the possible variants, an APP can be considered with the head part in the form of a polyhedron, which is not precisely regular in a strict mathematical sense, with surface formed by flat faces, wherein flow vortex generators are ribs formed by mating those faces at the angle $\xi \neq 0$ with the curvature within $0-\pm(0.9/H)$ and the outline dimensions within $0.01H-0.4H$, where H is the minimal outline dimension of the head part (FIG. 7).

To obtain the geometrical shape of the a polyhedronal APP, the following regular polyhedrons were used:
1. A regular icosahedron with 20 faces (regular triangles) and 12 vertexes, each to be defined with a set of vertexes of three centered orthogonal rectangles;
2. A regular dodecahedron with 12 faces (regular pentagons) formed by crossing planes passing through icosahedron vertexes perpendicular to radius vectors of vertexes.

Based on test results, the maximum effect is achieved with the head part made as a polyhedron with 192 faces built based on a dodecahedron. Such an APP is presented on FIG. 2. The 192-face polyhedron is obtained by adding a convex polyhedron onto every face of a dodecahedron, with one face of the convex polyhedron matching the face of the dodecahedron (called the base)—this would be an internal face; yet another face would be parallel, similar to and coaxial with the base—this would be an external central face; and the remaining 15 external faces would be irregular triangles. Besides, the additional polyhedron has 5 internal "lateral" faces, by which mating with neighbors takes place. The shape of triangular faces is defined by the size of the central face. Mating polyhedron faces creates ribs, which are flow vortex generators in this embodiment of the APP. The intake holes (12 holes) are located along radius vectors of the dodecahedron faces centers, in the centers of external central faces of the additional polyhedrons. It follows from the above that the number of faces is defined by a method of partitioning outer side faces of the additional polyhedron. Tested were head parts having 192, 492, and 912 faces. Preferred was the one with 192 faces. In the selected range of 10-1000 faces, the lower limit leaves out a 8-face cube which cannot be used for making an all-aspect APP, whereas the airfoil flow of the head part having the number of faces beyond the upper limit of the range is similar to that with a smooth sphere, and the effect of the proposed APP disappears.

The support 5 may be implemented as a regular 12-face cylinder, with a circle circumscribed around and having diameter d equal to 0.4 of the minimum outline dimension of the head part H. The support axis passes through the center and one vertex of the basic dodecahedron, i.e. the support passes between three intake holes at equal distance from them. The support length should not be less than two minimum outline dimensions of the head part, counting from the vertex of the 192-face polyhedron, the vertex being closest to the support and lying on the axis of the polyhedron.

The surface of the support is smooth, in a mathematical sense, meaning that it can be differentiated in any point. An example of such a surface is a circular or elliptical cylinder. Vortex generators including ribs on the surface are special points where the surface is non-differentiable. However, adjusting the support including a circular cylinder to the edge surface of the head part is inconvenient. Therefore a solution is possible (conventionally termed 'partially smooth') where a portion of the support mating the head part is made polygonal in cross section whereas the rest of the support is a circular cylinder, the both portions smoothly fairing with each other.

The principle of operation of the APP according to the present invention is as follows. Pressures, accepted by the intake holes 2, are passed via pneumatic channels 3 to be measured by measuring instruments (not shown) connected to couplers 4. The probe itself is pre-calibrated in a wind tunnel, with the calibration results providing a math model of the APP, the model including interpolation tables which cover entirely the operating speed and downwash angle ranges and are stored in the memory of a computing unit. Having the pressures measured allows determining the position of the flow stagnation point on the APP head part, and the intake holes, which lie within the area of the attached flow, are detected. Next, using the information about the pressures, which were measured within the area of the attached flow, and using the algorithm in the APP computing unit, calculated would be the module and the direction of the approaching flow, as well as the static pressure value.

Figure 8:
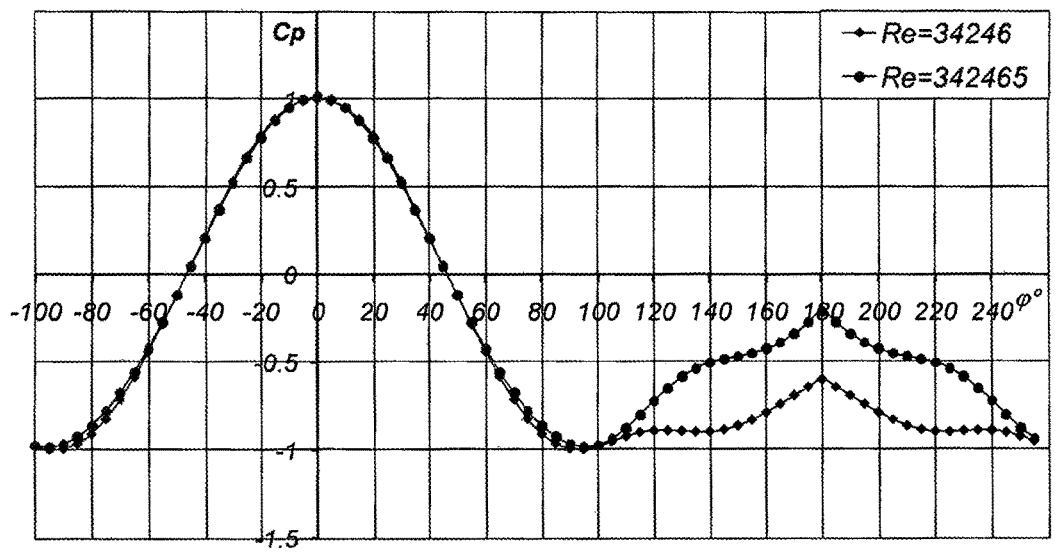
FIG. 8 represents the distribution of the coefficient of the measured pressure over the surface of the convex polyhedron head part for various Reynolds numbers.
Figure 9:
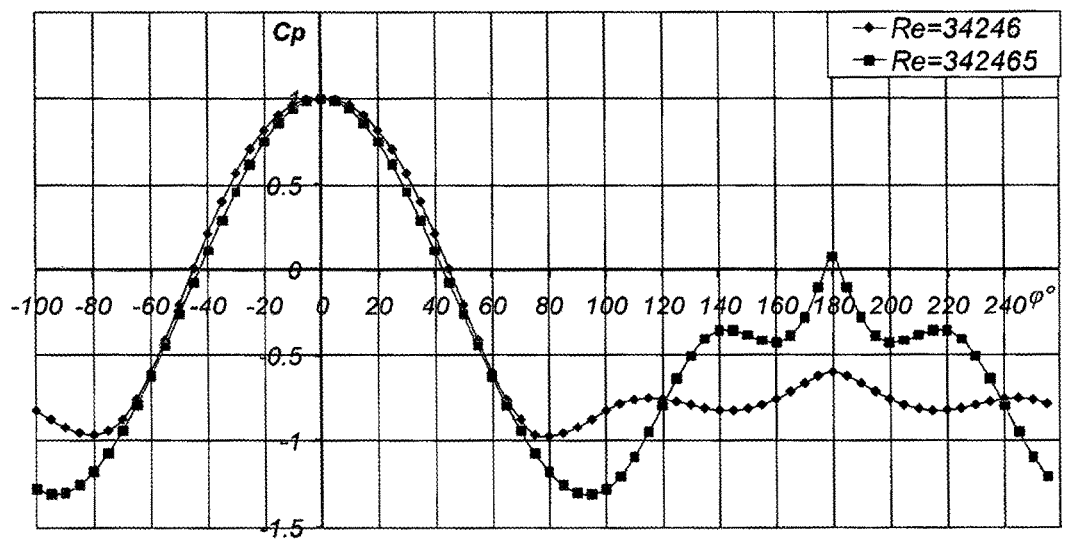
FIG. 9 represents the distribution of the coefficient of the measured pressure over the surface of the sphere head part for various Reynolds numbers.

The invention allows achieving the expected technical result. It can be demonstrated as follows.
1. FIGS. 8 and 9 present the distribution of the coefficient of the pressure over the surface of the APP polyhedron head part for the number of faces N=192, and of the sphere, for various Reynolds numbers, as measured in a wind tunnel.

By comparing the obtained dependences with charts known in the art (K. P. Petrov, Ibid.), one could notice the supercritical flow-around of the multi-face APP head part, throughout the entire Reynolds numbers range (with separation taking place at φ>93°, where φ is the angle between radius vectors of the stagnation point and the separation point of the boundary layer, with pressure coefficient in the separation point $C_p$<−0.9, and the behavior of the pressure coefficient after separation corresponds to that in the supercritical flow-around mode). For the APP with a spherical head part, the opposite would be true, and the flow-around nature would depend on the Reynolds number. One can see (FIG. 9), that, with Re=34246, the flow-around of a sphere would be subcritical, while Re=342465 would result in the supercritical flow-around.

Figure 10:
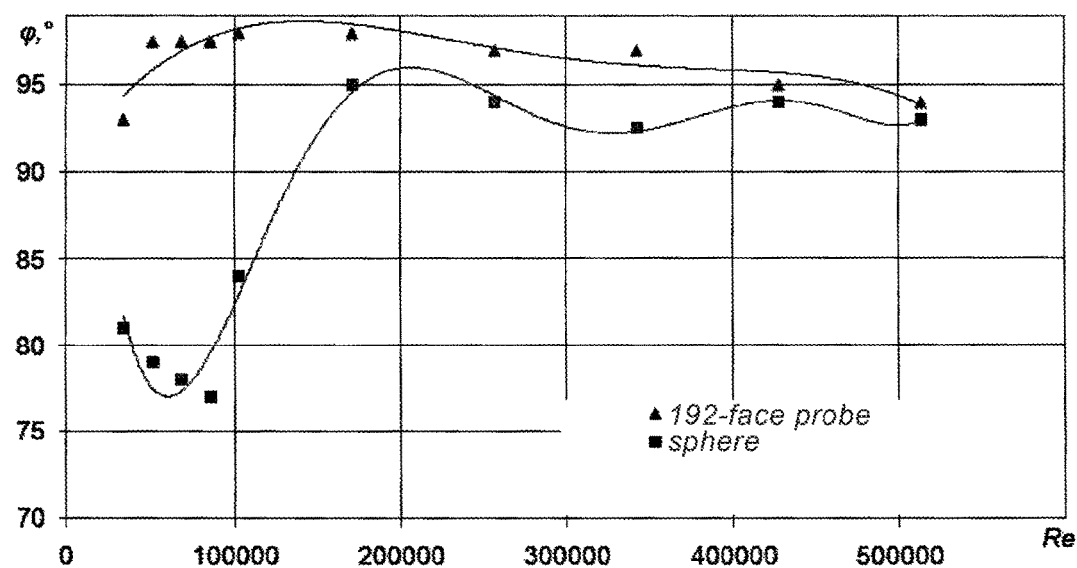
FIG. 10 represents the dependence of the separation point angular position on the Reynolds number for APPs with the head part made as a convex polyhedron and a sphere.

2. FIG. 10 represents dependences of the angular position of the boundary layer separation point on the Reynolds number, which were obtained with the wind tunnel, for an APP with the head part in the form of a polyhedron with N=192 faces, and a sphere. It can be observed that for the APP with the polyhedron head part, the separation takes place at the points with the angular coordinate φ>93° throughout the entire Reynolds numbers range considered, and this corresponds to the supercritical flow-around mode. At the same time, the APP with the spherical head part has a lesser attached flow area, and with small Reynolds numbers corresponding to the subcritical flow-around, the separation takes place at points with angular coordinate φ<80°.

3. The Reynolds-number independence of the nature of the flow-around of the APP eliminates limitations on the dimensions of the head part thereof, thus making possible measuring the speed vector throughout the entire subsonic range. Besides, increased dimensions of the head part allows bigger diameters of the intake holes and pneumatic channels, thus reducing the chance for APP failure due to a mechanical action, and it also reduces the delay in obtaining the measurement results. Also, a bigger APP may host a heating system and a system for condensed water vapor removal. Altogether, this allows using the APP with various types of flying vehicles.

4. The implementation of the invention allows, while keeping the opportunity to measure randomly directed speed vector, reducing the number of required intake holes from 18 down to 12. Therefore, the number of required pneumatic channels and couplers would be reduced correspondingly, and both the design and the production technology of the APP would be simplified.

The invention claimed is:

1. An all-aspect air pressure probe comprising a front part with intake holes located thereon, the intake holes being connected via pneumatic channels with couplers, and a back part, attached to the front part from behind, the front part further comprising flow vortex generators located on a surface thereof, the flow vortex generators including ribs formed by mating surface elements at an angle ξ≠0 with curvature lying between 0 and ±0.9/H and outline dimensions between 0.01H and 0.4H, where H is the minimum outline dimension of the front part, whereby supercritical flow around the front part, widening operating range of Reynolds numbers in incompressible flow modes, and determining static pressure and the speed vector of the approaching flow regardless of its orientation are secured, thus making possible measuring the altitude and speed vector in the subsonic range and using the probe with flying vehicles.

2. The air pressure probe of claim 1, wherein the front part is shaped as a convex polyhedron with a number of flat faces falling within the range of 10-1000.

3. The air pressure probe of claim 2, wherein the front part is shaped as an icosahedron.

4. The air pressure probe of claim 2, wherein the front part is shaped as a dodecahedron.

5. The air pressure probe of claim 2, wherein the front part is shaped as a polyhedron with 192 faces.

6. The air pressure probe of claim 2, wherein the intake holes are located on the faces.

7. The air pressure probe of claim 1, wherein the back part surface is made smooth or partly smooth.

8. The air pressure probe of claim 1, wherein the back part surface includes a multi-sided cylinder, the diameter d of the circle circumscribed around the cross-section of the cylinder meeting the criteria d<H.

9. An air pressure probe comprising a front part with intake holes located thereon, the intake holes being connected via pneumatic channels with couplers, and a back part, attached to the front part from behind, wherein the front part is shaped as a convex polyhedron with 192 faces and comprises flow vortex generators located on a surface thereof, whereas the back part surface is made smooth or partly smooth, whereby supercritical flow-around is secured and the influence of the Reynolds number is eliminated, the 192-face polyhedron being obtained by adding a convex polyhedron onto every face of a dodecahedron, with one face of the convex polyhedron matching the face of the dodecahedron to be an internal face; another face being parallel, similar to and coaxial with said one and being an external central face; and the remaining external faces being irregular triangles.

10. The air pressure probe of claim 9, wherein the flow vortex generators include ribs formed by mating surface elements at an angle ξ≠0 with curvature lying between 0 and ±0.9/H and outline dimensions between 0.01H and 0.4H, where H is the minimum outline dimension of the front part.

11. The air pressure probe of claim 9, wherein the intake holes are located on the faces.

12. The air pressure probe of claim 9, wherein the flow vortex generators include indentations $a_1$≤0.1H deep and $b_1$≤0.1H wide, or protrusions $a_2$≤0.1H high and $b_2$≤0.1H wide, where H is the minimum outline dimension of the front part.

13. An air pressure probe comprising a front part with intake holes located thereon, the intake holes being connected via pneumatic channels with couplers, and a back part, attached to the front part from behind, wherein the front part further comprises flow vortex generators located on a surface thereof, and wherein the back part includes a multi-sided cylinder, the diameter d of the circle circumscribed around the cross-section of the cylinder meeting the criteria d<H, where H is the minimum outline dimension of the front part, whereby supercritical flow-around is secured and the influence of the Reynolds number is eliminated.

14. The air pressure probe of claim 13, wherein the flow vortex generators include ribs formed by mating surface elements at an angle ξ≠0 with curvature lying between 0 and ±0.9/H and outline dimensions between 0.01H and 0.4H, where H is the minimum outline dimension of the front part.

15. The air pressure probe of claim 2, wherein the intake holes are located on the faces.

16. The air pressure probe of claim 1, wherein the flow vortex generators include indentations $a_1$≤0.1H deep and $b_1 \leq 0.1H$ wide, or protrusions $a_2 \leq 0.1H$ high and $b_2 \leq 0.1H$ wide, where H is the minimum outline dimension of the front part.

\* \* \* \* \*